No. 775,815. PATENTED NOV. 22, 1904.
J. GIRLOT.
MACHINE FOR WELDING OR FORGING METALLIC RINGS OR LINKS.
APPLICATION FILED JULY 21, 1903.
NO MODEL. 2 SHEETS—SHEET 1.
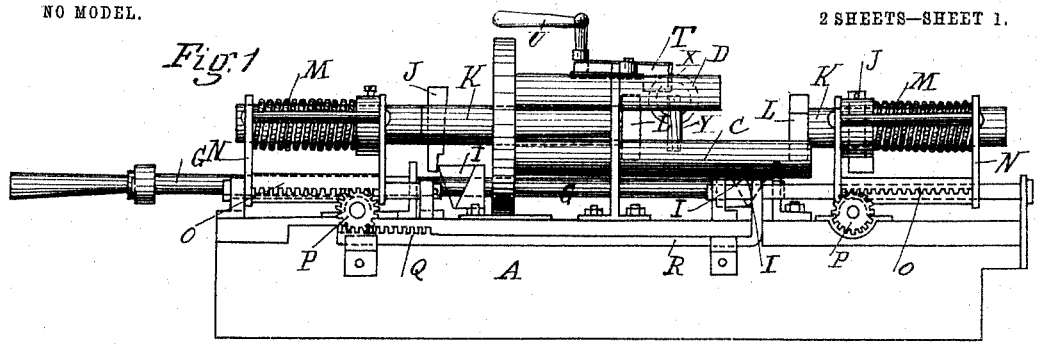
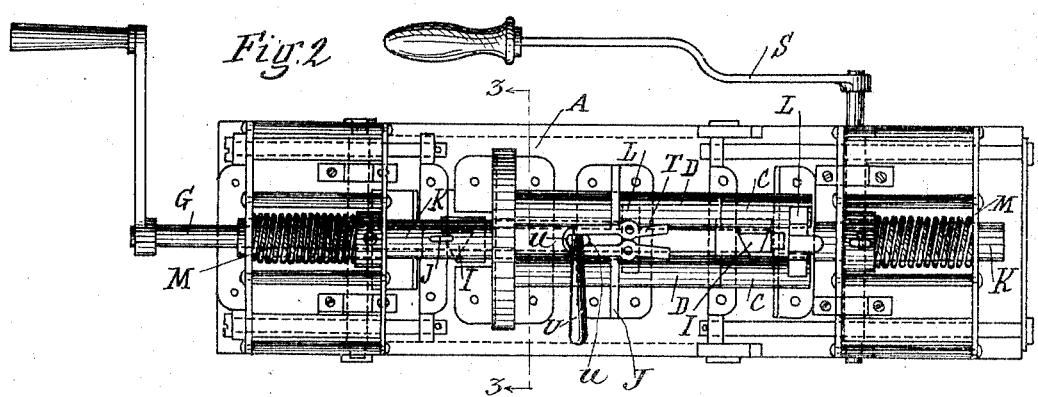
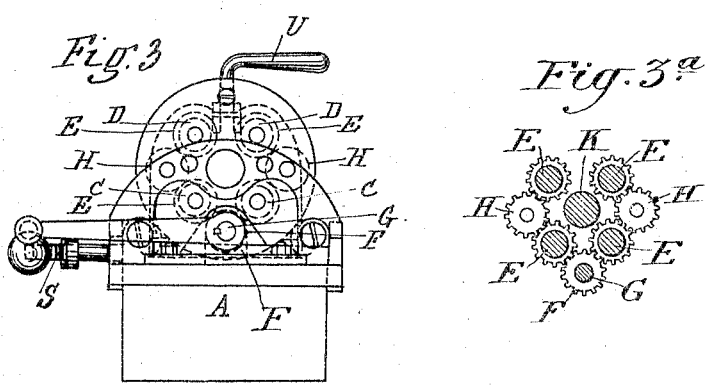

No. 775,815. PATENTED NOV. 22, 1904.
J. GIRLOT.
MACHINE FOR WELDING OR FORGING METALLIC RINGS OR LINKS.
APPLICATION FILED JULY 21, 1903.
NO MODEL. 2 SHEETS—SHEET 2.
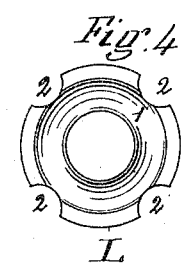
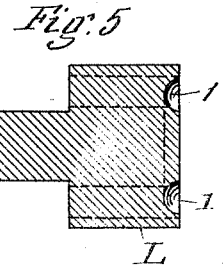
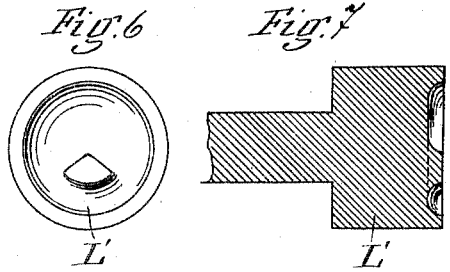
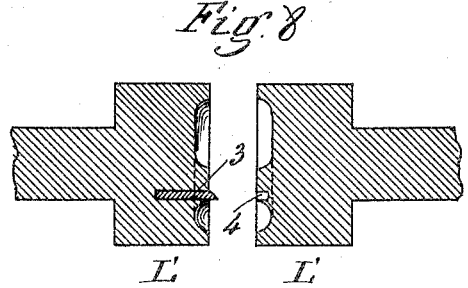
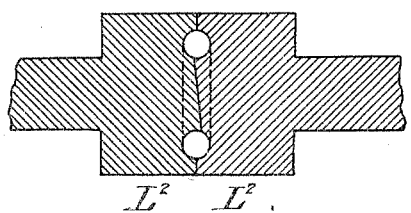
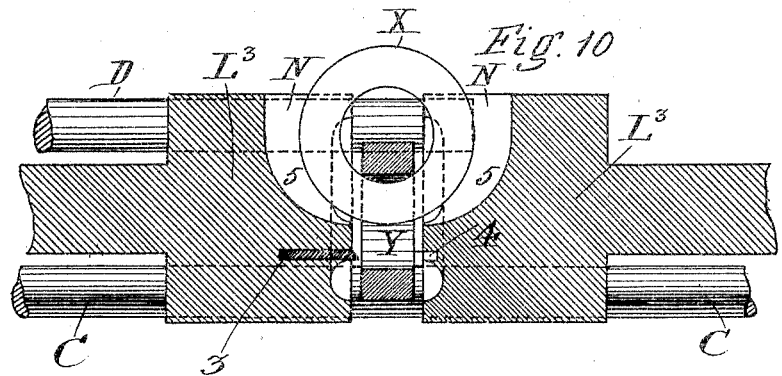
WITNESSES:
INVENTOR
HIS ATTORNEYS.

No. 775,815.

Patented November 22, 1904.

UNITED STATES PATENT OFFICE.

JOSEPH GIRLOT, OF JETTE ST. PIERRE, BELGIUM.

MACHINE FOR WELDING OR FORGING METALLIC RINGS OR LINKS.

SPECIFICATION forming part of Letters Patent No. 775,815, dated November 22, 1904.

Application filed July 21, 1903. Serial No. 166,434. (No model.)

*To all whom it may concern:*

Be it known that I, JOSEPH GIRLOT, a subject of the King of Belgium, residing at 254 Rue Leopold, Jette St. Pierre, Belgium, have invented certain new and useful Improvements in Machines for Welding or Forging Metallic Rings or Links, of which the following is a specification.

The machine forming the object of my invention is designed to effect the welding and forging of a metallic ring or link—such, for instance, as shown and described in my application for United States Patent, Serial No. 164,908, filed July 9, 1903—or to forge a previously-welded link and to so shape and finish it as to give it any desired cross-section or to increase its toughness.

In the annexed drawings, Figure 1 is a longitudinal elevation of the apparatus. Fig. 2 is a plan view of the same; Fig. 3, an end view; and Fig. 3$^a$ is a detail sectional view of the gearing on line 3 3, Fig. 2. Figs. 4 to 10 represent details or modifications of form of certain parts.

The machine comprises, essentially, four shafts, the two lower ones C C being longer than the two upper ones D D. On a shaft G, which is operated by a crank-handle or a pulley and belt, is mounted a gearing F, which operates two of the gear-wheels E on the shafts C C and (through the medium of the gear-wheels H H) the two other gear-wheels E E, mounted on the shafts D D in such a manner as to rotate these four shafts in the same direction, which movement they communicate to the ring Y being operated upon, which is placed between them. In order to allow the ring or link to be placed between these four shafts and in order to facilitate removal, the upper shafts D D are made shorter than the others. Hammer-heads L L are placed between these shafts C C and D D and mounted on shafts K K, carrying tappets J J and movable longitudinally—that is to say, parallel—to the axis of the shafts. The backward motion of these hammers is produced by the cams I I, mounted on the shaft G and acting on the tappets J J to push them back. When the cams I I cease to press against these tappets, the sharp return motion of the hammers L L is produced by the springs M M, and it is this movement of the hammers which effects the hammering or forging. The shafts K and their spring M are mounted on carriages N N, which can be brought toward each other or separated more or less at will by means of a hand-lever S. This is accomplished by providing each carriage with a rack O, with each of which racks there meshes a gear P, secured in bearings in the base. A rod R, with a rack Q, engages one gear and is attached to the other carriage, so as to partake of motion with it. The lever S is secured to the shaft of the other gear P and when operated moves its carriage and the rod R, thereby rotating the other gear, thus causing both carriages to approach or recede from one another.

If the ring or link Y to be operated on is enchained with another—as, for example, X— pivoted gripping-levers T, controlled by a cam $w$ and handle U, serve to grip a finished link X during the operation. These gripping-levers T are mounted on a plate J on a frame A. The faces of the hammers L L may be flat for welding a volute ring, such as Y, or be formed to conform to the ultimate section to be given to a ring. For example, if it be desired to make chain-links of round cross-section the hammers L L would have the shape shown in Figs. 4 and 5, in which the annular hollow 1 corresponds to the shape to be given to the links, the grooves 2 2 2 2 serve to receive the shafts C C and D D, which may continuously or intermittently rotate the ring being forged or the hammers L' L' may have the shape shown in Figs. 6 and 7. This shape is adapted to allow the link to increase in diameter during the operation. It is the lower parts only of the hammers in these figures which serve to give the desired cross-section to the link, although the other parts may strike the link at the same time. The hammers L' L' can be arranged to automatically remove the excess of material as it is produced. For this purpose one can be provided with a cutter 3 and the other with a corresponding groove 4, as in Fig. 8, or the faces of the hammers L$^2$ may be inclined, as in Fig. 9. When the link is connected to another link, the hammers L³ L³ have grooves or notches N corresponding to the already-finished link for the purpose of lodging same therein, as at 5, Fig. 10.

In operation a spiral or volute ring at welding heat is placed in the midst of the four rolls D D C C, and the hammers L L are operated to compress the same and weld the different convolutions of the spiral together, the ring being continuously rotated during such welding. If the hammers be formed, as shown, each with recessed face, they will form the hot metal to conform thereto. If the hammers be provided with the knife of Fig. 8, the interior of the link will be trimmed of excess metal. During this welding and forging it will be remembered that the ring is in constant rotation between the four rolls. When a link has been formed, it is removed and placed in the position of ring X of the drawings, depending between the rolls D D into the center of the rolls, so that the next spiral Y will be threaded into the central opening of the previously-formed link X. When such spiral Y has entirely engaged said finished ring X, the hammers are again operated to first compress and then weld and forge the spiral into the shape of the previously-formed link X.

I claim as my invention—

1. A machine for use in the manufacture of chain-links, comprising a number of parallel rolls and means to rotate them in the same direction, whereby rotary motion is imparted to a ring held between them, in combination with means adapted to act against the link held by the rolls.

2. A machine for use in the manufacture of chain-links, comprising a number of parallel rolls and means to rotate them in the same direction whereby rotary motion is imparted to a ring held between them, in combination with hammers with recessed faces and means for moving said hammers in a direction parallel to said rolls.

3. A machine for use in the manufacture of chain-links, comprising a number of parallel rolls and means to rotate them in the same direction whereby a rotary motion is imparted to a ring held between them, in combination with hammers with recessed faces and a knife for cutting off superfluous material, and means for moving said hammers in a direction parallel to said rolls.

4. A machine for use in the manufacture of chain-links, comprising a number of rolls, and means for rotating them in the same direction, some of said rolls being shorter than others, and hammers movable in a direction parallel to said rolls and located centrally to the rolls.

5. A machine for the manufacture of chain-links, comprising rolls, means for rotating them in the same direction, a gripping device adjacent to the rolls and adapted to hold a previously-formed link, centrally-placed hammers within the space bounded by the rolls, and means for operating said hammers.

6. A machine for use in the manufacture of chain-links, comprising parallel rolls grouped around a common center, a hammer-shaft on a line with said common center, means for rotating the rolls in the same direction and means for operating the hammer-shaft.

7. A machine for use in the manufacture of chain-links, comprising parallel rolls grouped around a common center, a hammer-shaft on the line of said common center, means for rotating the rolls in the same direction, and a carriage for said hammer-shaft, and means carried on said carriage for impelling the hammer.

8. A machine for use in the manufacture of chain-links, comprising parallel rolls grouped around a common center, a hammer-shaft on the line of said common center, means for rotating the rolls in the same direction and a carriage for said hammer-shaft, means carried on said carriage for impelling the hammer, and means for moving said carriage in a direction parallel to the rolls.

In testimony whereof I have signed my name to this specification in the presence of two subscribing witnesses.

JOSEPH GIRLOT.

Witnesses:
  GUSTAVE TIERRY,
  MAURICE GERBEAULT.